May 31, 1927.
C. RORABECK
SPROCKET WHEEL
Filed April 30, 1925    2 Sheets-Sheet 2
1,630,313
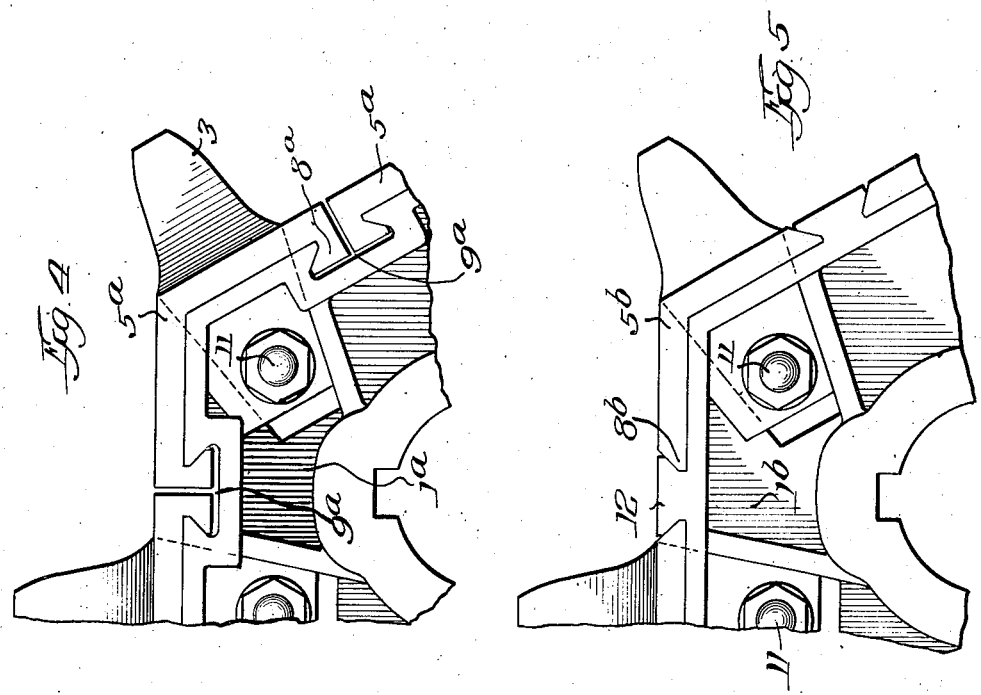
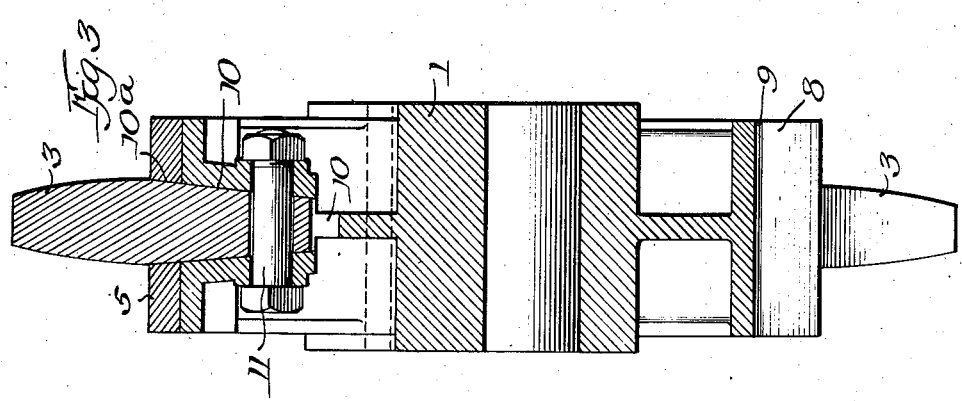
Witness:
Inventor
Claude Rorabeck
By Wilkinson, Hurley, Byron & Knight
Attys Patented May 31, 1927.

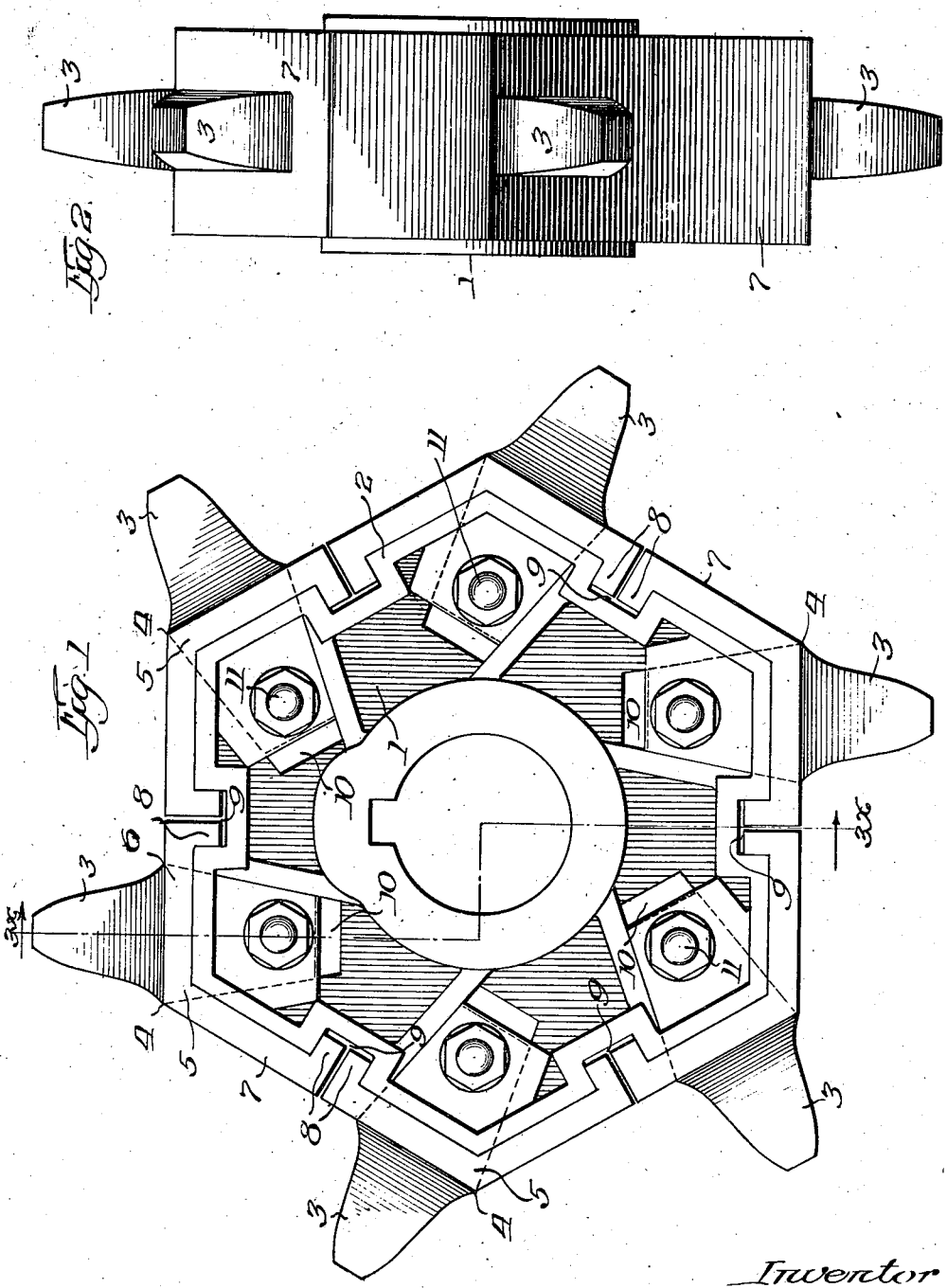

1,630,313

UNITED STATES PATENT OFFICE.

CLAUDE RORABECK, OF CHICAGO HEIGHTS, ILLINOIS, ASSIGNOR TO AMERICAN MANGANESE STEEL COMPANY, OF CHICAGO, ILLINOIS, A CORPORATION OF MAINE.

SPROCKET WHEEL.

Application filed April 30, 1925. Serial No. 26,855.

This invention relates to wheels having teeth or other specially designed contour adapting them to enter into driving relation with a chain by engagement therewith as distinguished from mere frictional contact; for instance a sprocket wheel, the perimeter of which is in the form of a regular polygon rather than cylindrical, and the invention finds its fullest realization in a sprocket wheel having not only polygonal periphery but also projecting teeth as the means for establishing driving engagement with the chain.

In sprockets of this kind, particularly when used in situations where the engaging surfaces are subjected to excessive wear, it is desirable to have the outer peripheral surface of the sprocket wheel replaceable, as well as the teeth, in order to prolong the life of the article; and, accordingly, one object of the present invention is to provide an improved construction of replaceable rim on a sprocket wheel, and to form such rim of a plurality of separately formed segments each of which is adapted to be mounted upon the sprocket wheel through means of fitting faces that will interlock the parts against displacement in directions of drive, as well as radially to the wheel and will admit of assembly only in directions at a substantial angle to the plane of the wheel, for instance, in the direction of the wheel's axis. To this end, each rim segment is formed to fit an external angle of the polygon and to constitute a portion of each of the bearing faces which meet at the angle; the ends of said segment being provided with interlocking lugs extending inwardly toward the center of the wheel and entering recesses in the body of the wheel, thereby adapting the segment to grip the wheel and resist displacement of the segment, particularly in the direction radial to the wheel. Inasmuch as there are two of these anchoring or gripping lugs, and they are presented at substantially less than a right angle to the chord of the segment, they are adapted to resist radial displacement of the segment as well as displacement in the direction of the drive, so that the segment is movable relatively to the wheel for assembly and disassembly only in a direction parallel to the axis of the wheel.

Another object of the invention is to provide a replaceable tooth on a wheel of the kind described, which, for the sake of rendering it reversible in position, notwithstanding it may assume an unsymmetrical relation to the two sides of the replaceable segment, is made separate and apart from the segment, and assembled with the wheel by introducing it into a socket of the body of the wheel and there securing it by means of a pin, bolt, or the like.

Still another object of the invention is to utilize the separately formed and removably inserted sprocket tooth as a means for preventing movement of the rim segment on the body of the wheel in the direction of disassembly; and, to this end, another feature of the invention consists in extending the tooth-receiving socket through the rim segment so that when the rim segment has been assembled by a sliding movement parallel with the axis of the wheel, and the tooth has been introduced into its socket by a movement transverse to the assembling movement of the segment and said tooth has been secured against removal, the parts will be releasable for replacement by merely taking out the pin or bolt that secures the tooth and reversing the order of assembly.

In order that the invention may be fully understood, two embodiments thereof are shown in the accompanying drawings, in which—

Figures 1 and 2 are two elevational views, as seen in directions at right angles to each other, showing one form of the invention.

Figure 3 is a section on the line 3$^x$—3$^x$ of Figure 1.

Figure 4 is a fragmentary view showing a modified form of anchoring lugs through means of which the segments grip the body; and Figure 5 is a similar view snowing still another form of interengagement between the segments and the body of the wheel.

1 represents the body of a sprocket wheel adapted to be mounted upon a shaft through which it is to be driven. The periphery 2 of this body portion follows in general the outline of a hexagon, from which project driving teeth 3 at regular intervals, for instance, by having each tooth 3 positioned with its longitudinal axis perpendicular to a side of the polygon adjacent the angle 4.

In order to make the periphery of the wheel 1 replaceable when worn, it has a separable rim made up of a plurality of segments 5, each of which comprises in its form portions 6 and 7 of the faces of the polygon of the wheel, and each of which is anchored to the wheel by means of lugs 8 at its respective ends which enter recesses 9 in the body of the wheel. Inasmuch as the lugs 8 are inclined inwardly from the medial radius of the segment 5, it is obvious that said segment cannot be lifted from the body of the wheel by a radial movement, nor would it be possible to displace the segment from the body by swinging it upon one of its lugs 8, since the path of movement of the inner corner of its other lug would intersect the radial wall of the recess 9. Hence, the lugs 8 are interlocking means resisting outward displacement of the segments, as well as anchoring means which resist displacement in the direction of drive, and assembly and disassembly of a segment with the wheel is limited to movement substantially parallel with the axis of the wheel.

The teeth 3 are mounted on the wheel by introducing them into sockets 10 which could, of course, be made with their axes coincident with radii of the wheel extending through the corners of the polygon in accordance with known forms of drive sprockets, but they are preferably formed so as to present each tooth normal to a face of the polygon near one end of the face or the angle at which it meets an adjoining face; and in order that the tooth 3 may constitute the means for resisting disassembly of the segment 6 from the wheel, the socket is continued through the segment, as shown at 10$^a$ in Figure 3. As also shown in Figure 3 the inner end of the tooth 3 has its sides inclined to the circumferential radial plane of the wheel, so that it has a wedging seating in the socket laterally as well as in the circumferential direction, as shown in Figure 1. The teeth are secured in their sockets by any suitable form of pin, for instance, the bolts 11.

As shown in Figure 4, the segments 5$^a$ may have their anchoring lugs 8$^a$ formed with half dovetails or inward enlargements conforming to dovetailed recesses 9$^a$ in the body 1$^a$ of the wheel, so as to further increase their grip upon the body of the wheel. Or, as shown in Figure 5, segments 5$^b$ may have anchoring and gripping lugs 8$^b$ engaging the undercut sides of rim lugs 12 on the body 1$^b$ of the wheel.

I claim:

1. A sprocket wheel, comprising a body portion having a polygonal periphery and a separately formed rim composed of segments, each of which conforms to portions of two adjacent sides of the polygon and to the angle between them; said segments having lugs engaging recesses in the wheel; the lugs on a segment converging with respect to the medial radial plane of the segment and interlocking the segment against radial displacement from the wheel.

2. A sprocket wheel, comprising a body portion having a polygonal periphery and a separately formed rim composed of segments, each of which conforms to portions of two adjacent sides of the polygon and to the angle between them; said segments having lugs engaging recesses in the wheel; the lugs on a segment converging with respect to the medial radial plane of the segment and interlocking the segment against radial displacement from the wheel, and enlarging inwardly to increase such interlock.

3. A sprocket wheel, consisting of a polygonal body portion, separately formed rim segments each conforming to two adjacent sides of the polygon of the body portion, sliding into assembly with the body portion in the direction of its axis and interlocking against displacement thereon either circumferentially or radially, and removable teeth socketed in the body portion and intersecting the rim segments and holding them against disassembly.

4. A sprocket wheel, consisting of a polygonal body portion, separately formed rim segments each conforming to two adjacent sides of the polygon of the body portion, sliding into assembly with the body portion in the direction of its axis and interlocking against displacement thereon either circumferentially or radially, and removable teeth socketed in the body portion and intersecting the rim segments and holding them against disassembly; each tooth being located with its longitudinal axis normal to one face of the polygon adjacent an angle of the polygon.

Signed at Chicago Heights, Illinois, this 23rd day of April, 1925.

CLAUDE RORABECK.